(12) United States Patent
Zones et al.

(10) Patent No.: US 9,718,051 B2
(45) Date of Patent: Aug. 1, 2017

(54) ZEOLITE SSZ-57 HAVING ENHANCED LARGE PORE SELECTVITY

(71) Applicant: Chevron U.S.A. Inc., San Ramon, CA (US)

(72) Inventors: Stacey Ian Zones, San Francisco, CA (US); Cong-Yan Chen, Kensington, CA (US); Annabelle Benin, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 282 days.

(21) Appl. No.: 14/189,556

(22) Filed: Feb. 25, 2014

(65) Prior Publication Data

US 2014/0241980 A1    Aug. 28, 2014

Related U.S. Application Data

(60) Provisional application No. 61/771,069, filed on Feb. 28, 2013.

(51) Int. Cl.
| | | |
|---|---|---|
| *C01B 39/02* | (2006.01) | |
| *B01J 29/86* | (2006.01) | |
| *B01J 29/70* | (2006.01) | |
| *C01B 39/36* | (2006.01) | |
| *B01J 35/00* | (2006.01) | |

(52) U.S. Cl.
CPC ............. *B01J 29/86* (2013.01); *C01B 39/026* (2013.01); *B01J 29/70* (2013.01); *B01J 35/002* (2013.01); *B01J 2229/183* (2013.01); *C01B 39/023* (2013.01); *C01B 39/36* (2013.01)

(58) Field of Classification Search
CPC ........ C01B 39/54; C01B 39/026; B01J 29/86; B01J 29/70; B01J 2229/183
See application file for complete search history.

(56) References Cited

U.S. PATENT DOCUMENTS

| | | | | | |
|---|---|---|---|---|---|
| 4,963,337 | A | * | 10/1990 | Zones | ...................... B01J 29/04 423/277 |
| 6,468,501 | B1 | * | 10/2002 | Chen | ..................... C01B 39/026 423/713 |
| 6,544,495 | B1 | | 4/2003 | Elomari | |
| 6,790,433 | B2 | * | 9/2004 | Chen | ..................... C01B 39/026 423/713 |
| 2003/0066785 | A1 | | 4/2003 | Elomari | |

FOREIGN PATENT DOCUMENTS

EP         2036608         3/2009

OTHER PUBLICATIONS

PCT/US2014/018348 Notification of Transmittal of the International Search Report and the Written Opinion of the International Searching Authority, or the Declaration, mail date Sep. 25, 2014, 88 pages.

* cited by examiner

*Primary Examiner* — David M Brunsman
(74) *Attorney, Agent, or Firm* — E. Joseph Gess; Terrence M. Flaherty; Melissa M. Hayworth

(57) ABSTRACT

The present invention is directed to an alumino-borosilicate SSZ-57 zeolite having enhanced large pore selectivity. The alumino-borosilicate SSZ-57 zeolite of the present invention is characterized as having substantially all of its aluminum atoms located within regions of the zeolite structure which form the 12 ring channels.

10 Claims, 1 Drawing Sheet

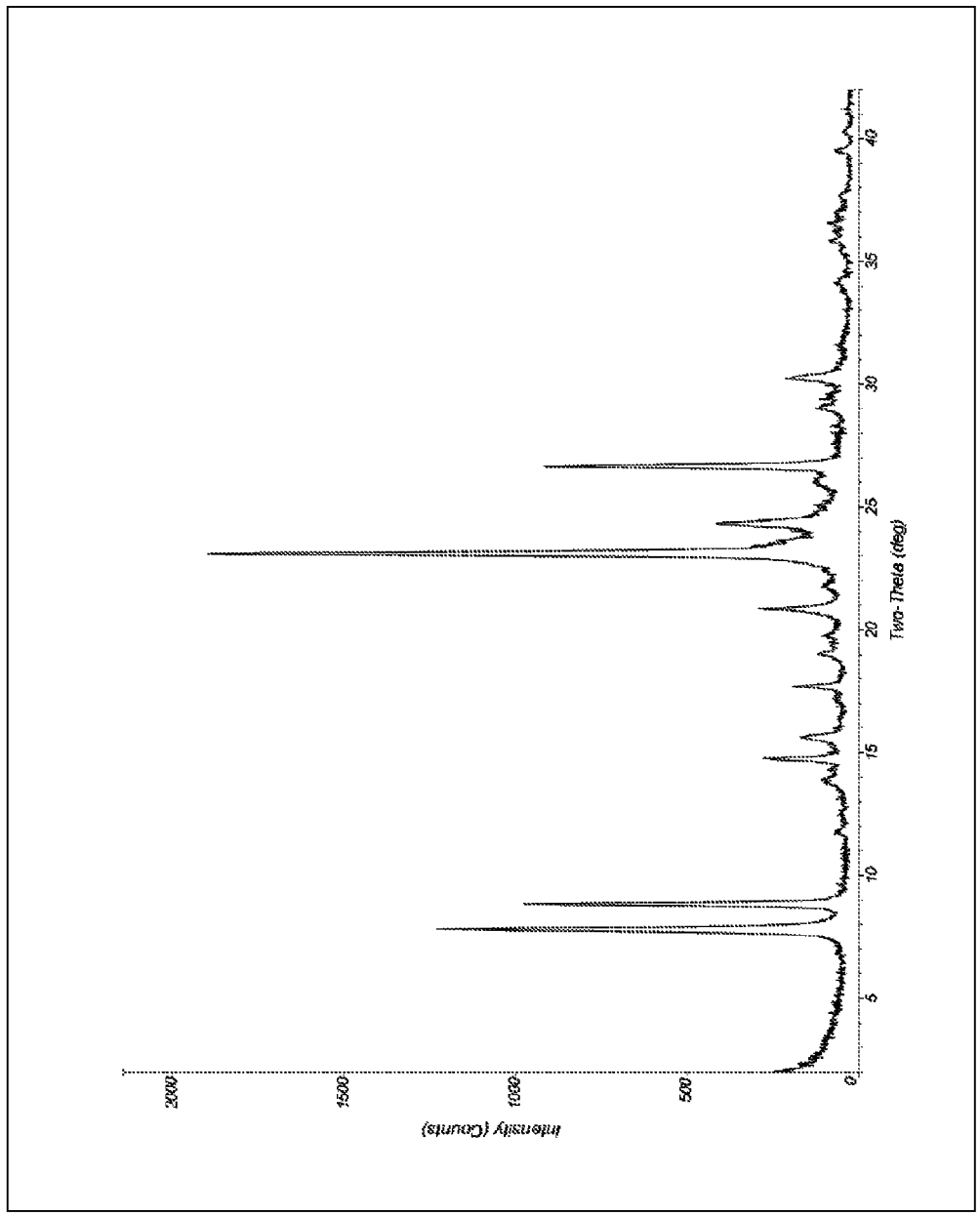

ZEOLITE SSZ-57 HAVING ENHANCED LARGE PORE SELECTVITY

FIELD OF THE INVENTION

The present invention is directed to an alumino-borosilicate SSZ-57 zeolite having enhanced large pore selectivity. The alumino-borosilicate SSZ-57 zeolite of the present invention is characterized as having substantially all of its aluminum atoms located within regions of the zeolite structure which form the 12 ring channels.

BACKGROUND OF THE INVENTION

Zeolites are a commercially important class of crystalline materials. They have distinct crystal structures with ordered pore structures which are demonstrated by distinct X-ray diffraction (XRD) patterns. The crystal structure defines cavities and pores which are characteristic of the different species.

Small pore zeolites generally have up to eight-membered ring (8-MR) structures and an average pore size less than 5 Å (0.5 nm), whereas intermediate pore zeolites generally have ten-membered ring (10-MR) structures and an average pore size of about 5 Å (0.5 nm) to about 7 Å (0.7 nm). Large pore zeolites generally have at least twelve-membered ring (12-MR) structures and an average pore size greater than about 7 Å (0.7 nm).

Within the pores of the zeolites, hydrocarbon conversion reactions such as paraffin isomerization, olefin skeletal or double bond isomerization, disproportionation, alkylation, and transalkylation of aromatics are governed by constraints imposed by the size of the channels of the zeolite. Reactant selectivity occurs when a fraction of the feedstock is too large to enter the pores to react; while product selectivity occurs when some of the products cannot leave the channels or do not subsequently react. Product distributions can also be altered by transition state selectivity in which certain reactions cannot occur because the reaction transition state is too large to form within the pores. Shape selectivity can also result from configuration constraints on diffusion where the dimensions of the molecule approach that of the pore.

Zeolite SSZ-57 is a known zeolite and was first disclosed in U.S. Pat. No. 6,544,495, issued Apr. 8, 2003 to Elomari. In 2011, SSZ-57 was assigned the framework type code *SFV by the Structure Commission of the International Zeolite Association (IZA).

The structure of SSZ-57 was recently resolved by C. Baerlocher et al. (*Science* 333, 1134-1137 (2011)), and is currently characterized as possessing a framework type described as a disturbed ZSM-11 (MEL) structure. The disturbances are 12-ring channels that substitute for 1 out of 16 10-ring channels, in an ordered manner. Disorder by the 12-membered rings channels results in a framework with large pockets of isolated three-dimensional 10-membered ring channel systems.

It has now been found that the large pore selectivity can be enhanced by substituting the boron in the borosilicate form of the zeolite with aluminum to yield an alumino-borosilicate material wherein substantially all of its aluminum atoms located within regions of the zeolite structure which form the 12 ring channels.

SUMMARY OF THE INVENTION

In accordance with the present invention there is provided an alumino-borosilicate SSZ-57 characterized as having substantially all of its aluminum located within regions of the zeolite structure which form the 12 ring channels.

The present invention also includes a process for preparing an alumino-borosilicate SSZ-57 molecular sieve by:

(a) preparing a reaction mixture containing: (1) at least one source of silicon oxide; (2) at least one source of boron oxide; (3) at least one source of an element selected from Groups 1 and 2 of the Periodic Table; (4) hydroxide ions; (5) a structure directing agent ("SDA") selected from the group consisting of an N-butyl-N-cyclohexylpyrrolidinium cation, an N-propyl-N-cycloheptylpyrrolidinium cation, an N-butyl-N-cyclooctylpyrrolidinium cation, and mixtures thereof; and (6) water;

(b) maintaining the reaction mixture under crystallization conditions sufficient to form crystals of borosilicate SSZ-57;

(c) subjecting the borosilicate SSZ-57 crystals to calcination conditions; and (d) replacing at least a portion of the boron in the 12-ring channels of framework of the calcined borosilicate SSZ-57 with aluminum to provide an alumino-borosilicate SSZ-57 characterized as having substantially all of its aluminum located within regions of the zeolite structure which form the 12 ring channels.

BRIEF DESCRIPTION OF THE DRAWINGS

FIG. 1 shows the results of powder X-ray diffraction analysis of the alumino-borosilicate SSZ-57 zeolite synthesized in Example 1.

DETAILED DESCRIPTION

Introduction

The following terms will be used throughout the specification and will have the following meanings unless otherwise indicated.

"Active source" means a reagent or precursor capable of supplying an element in a form that can react and be incorporated into the zeolite structure. The terms "source" and "active source" are used interchangeably herein.

"Constraint Index" (CI) is a convenient measure of the extent to which an aluminosilicate or other molecular sieve provides controlled access to molecules of varying sizes to its internal structure. Zeolites which provide a highly restricted access to and egress from its internal structure have a high value for the Constraint Index, and zeolites of this kind usually have pores of small size. On the other hand, zeolites which provide relatively free access to the internal zeolite structure have a low value for the Constraint Index, and usually have pores of large size. The methods by which Constraint Index can be determined are described fully by V. J. Frillette et al. in *J. Catal.* 67, 218-222 (1981) and by S. I. Zones et al. in *Microporous Mesoporous Mater.* 35-36, 31-46 (2000). Those zeolites exhibiting a Constraint Index value within the range of greater than about 12 are considered to be small pore size zeolites. Those zeolites exhibiting a Constraint Index value within the range of from about 1 to about 12 are considered to be intermediate pore size zeolites. Those zeolites exhibiting a Constraint Index value within the range of less than about 1 are considered to be large pore size zeolites.

In the Constraint Index test, the higher selectivity for admitting n-hexane over 3-methylpentane occurs as the pores become narrower. For example, small pore zeolites, which have 8-rings, ideally only select n-hexane and thus the CI value will be very high (i.e. 50 and higher). With intermediate pore zeolites, 10-rings the values will fall into a CI value range of 3-12. But one exception can be seen if the 10-ring portal opens into a larger cavity. So zeolite SSZ-35, for example, has an opening about the size of ZSM-5 but it gives a CI value below 1 (ZSM-5 will be 6-8 depending upon temperature). This is unexpected but seems to occur because the cavity allows the 3-methylpentane to get in more easily and allows for larger transition states in the reaction involving two reactants, making it easier to crack more 3-methylpentane (these, then, become the cases not anticipated by the Frillete paper). As the pores become large, there is no restriction for the 3-methylpentane, it is easier to crack from a thermodynamic point of view, and typically the large pore zeolites give a CI value below 1.0.

Isobutane to normal butane ratios (iso-$C_4$/n-$C_4$ ratios) refer to weight ratios, unless otherwise noted.

The term "Periodic Table" refers to the version of the IUPAC Periodic Table of the Elements dated Jun. 22, 2007, and the numbering scheme for the Periodic Table Groups is as described in *Chem. Eng. News* 63(5), 26-27 (1985).

The phrase "characterized as having substantially all of its aluminum atoms being located within regions of the zeolite structure which form the 12 ring channels," as used herein, means the molar amount of aluminum atoms located in the portion of the zeolite framework which forms the 10-ring channels is 10% or less of the total amount in the entire framework of the zeolite.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

Preparation of Al-SSZ-57LP

In preparing borosilicate SSZ-57 precursor material, a cation selected from the group consisting of an N-butyl-N-cyclohexylpyrrolidinium cation, an N-propyl-N-cycloheptylpyrrolidinium cation, an N-butyl-N-cyclooctylpyrrolidinium cation, and mixtures thereof, is used as a structure directing agent ("SDA"), also known as a crystallization template. The SDAs useful for making borosilicate SSZ-57 are represented by the following structures (1), (2) and (3):

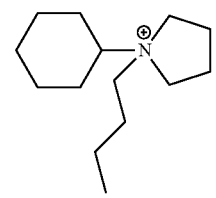

N-butyl-N-cyclohexylpyrrolidinium cation (1)

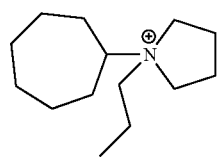

N-propyl-N-cycloheptylpyrrolidinium cation (2)

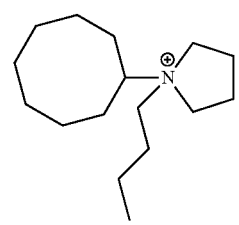

N-butyl-N-cyclooctylpyrrolidinium cation (3)

N-butyl-N-cyclohexylpyrrolidinium cations, N-propyl-N-cycloheptylpyrrolidinium cations, and N-butyl-N-cyclooctylpyrrolidinium cations can be prepared as described in U.S. Pat. No. 6,544,495 to Elomari, issued Apr. 8, 2003.

In general Al-SSZ-57LP is prepared by:

(a) preparing a reaction mixture containing: (1) at least one source of silicon oxide; (2) at least one source of boron oxide; (3) at least one source of an element selected from Groups 1 and 2 of the Periodic Table; (4) hydroxide ions; (5) a structure directing agent ("SDA") selected from the group consisting of an N-butyl-N-cyclohexylpyrrolidinium cation, an N-propyl-N-cycloheptylpyrrolidinium cation, an N-butyl-N-cyclooctylpyrrolidinium cation, and mixtures thereof; and (6) water;

(b) maintaining the reaction mixture under crystallization conditions sufficient to form crystals of borosilicate SSZ-57;

(c) subjecting the borosilicate SSZ-57 crystals to calcination conditions; and (d) replacing at least a portion of the boron in the 12-ring channels of framework of the borosilicate SSZ-57 with aluminum to provide an alumino-borosilicate SSZ-57 (Al-SSZ-57LP) characterized as having substantially all of its aluminum atoms located within regions of the zeolite structure which form the 12 ring channels.

The reaction mixture from which borosilicate SSZ-57 precursor material is formed, in terms of mole ratios, is identified in Table 1 below:

TABLE 1

|  | Broad | Exemplary |
|---|---|---|
| $SiO_2/B_2O_3$ | 10-500 | 20-100 |
| $OH^-/SiO_2$ | 0.1-0.50 | 0.2-0.3 |
| $Q/SiO_2$ | 0.05-0.5 | 0.1-0.2 |
| $M/SiO_2$ | 0.02-0.4 | 0.1-0.25 |
| $H_2O/SiO_2$ | 25-80 | 30-50 | wherein Q is a structure directing agent ("SDA") selected from the group consisting of an N-butyl-N-cyclohexylpyrrolidinium cations, an N-propyl-N-cycloheptylpyrrolidinium cations, an N-butyl-N-cyclooctylpyrrolidinium cations, and mixtures thereof; and M is an element selected from Groups 1 and 2 of the Periodic Table.

Sources of silicon oxide useful herein include fumed silica, precipitated silicates, silica hydrogel, silicic acid, colloidal silica, tetra-alkyl orthosilicates (e.g., tetraethyl orthosilicate), and silica hydroxides.

Sources of boron oxide which can be useful include borosilicate glasses, alkali borates, boric acid, borate esters, and certain molecular sieves. Non-limiting examples of a source of boron oxide include potassium tetraborate decahydrate and boron beta molecular sieve (B-beta molecular sieve).

For each embodiment described herein, the zeolite reaction mixture can be supplied by more than one source. Also, two or more reaction components can be provided by one source. As an example, borosilicate molecular sieves can be synthesized from boron-containing beta molecular sieves, as taught in U.S. Pat. No. 5,972,204.

The reaction mixture can be prepared either batch-wise or continuously. Crystal size, crystal morphology, and crystallization time of the borosilicate SSZ-57 can vary with the nature of the reaction mixture and the crystallization conditions.

The reaction mixture is maintained at an elevated temperature until crystals of the zeolite are formed. The hydrothermal crystallization is usually conducted under pressure, and usually in an autoclave so that the reaction mixture is subjected to autogenous pressure, at a temperature between 125° C. and 200° C.

During the hydrothermal crystallization step, the zeolite crystals can be allowed to nucleate spontaneously from the reaction mixture. The use of crystals of the zeolite as seed material can be advantageous in decreasing the time necessary for complete crystallization to occur. In addition, seeding can lead to an increased purity of the product by promoting the nucleation and/or formation of the zeolite over any undesired phases. When used as seeds, seed crystals are typically added in an amount of from 0.5% to 5% of the weight of the source of silicon oxide used in the reaction mixture.

Once the zeolite crystals have formed, the solid product is separated from the reaction mixture by standard mechanical separation techniques such as filtration. The crystals are water-washed and then dried to obtain the as-synthesized zeolite crystals. The drying step can be performed at atmospheric pressure or under vacuum.

The borosilicate SSZ-57 zeolite is then subjected to calcination conditions by heating the zeolite in steam, air or inert gas at temperatures ranging from 200° C. to 800° C. for a period of time ranging from 1 to 48 hours, or more Al-SSZ-57LP is prepared from borosilicate SSZ-57 by post-synthetic selective replacement of the boron in the borosilicate SSZ-57 framework with aluminum. "Selective replacement" as used herein means that 90 percent or more of the molar amount of aluminum atoms within the framework of the zeolite is located within the portions of the structure which form the 12-ring channels. Replacement of boron in the borosilicate SSZ-57 can be readily achieved by suitable treatment of the borosilicate SSZ-57 with an aluminum salt, such as aluminum nitrate. Such methods are known, for example as described in U.S. Pat. No. 6,468,501, issued Oct. 22, 2002 to Chen and Zones. It will be recognized by one skilled in the art that the range of the amount of boron that can be replaced in the framework structure by aluminum can vary depending on such factors as the length of time the zeolite is treated, reaction conditions and concentration the aluminum salt in the reaction mixture. In one embodiment, the calcined borosilicate SSZ-57 is subjected to an amount of aluminum nitrate nonahydrate for a time and at a temperature, sufficient to affect a replacement of an amount of boron in the 12-ring channel framework of the calcined borosilicate SSZ-57 with an amount of aluminum sufficient to yield an alumino-borosilicate SSZ-57 having measurably enhanced large pore selectivity.

Characterization of Al-SSZ-57LP

Al-SSZ-57LP zeolites made by the process described herein have a composition as described in Table 2 (in terms of mole ratios):

TABLE 2

|  | Broadest | Exemplary |
|---|---|---|
| $SiO_2/B_2O_3$ | 50-∞ | 100-400 |
| $SiO_2/Al_2O_3$ | 150-∞ | 150-400 |

The Al-SSZ-57LP zeolites prepared according to the teachings herein are characterized as having a Constraint Index (CI) of between 0.3 and 1.0, inclusive (0.3≤CI≤1.0), at 40 minutes on-stream using the process and conditions described in Example 2 herein.

The Al-SSZ-57LP zeolites described herein exhibit an iso-$C_4$/n-$C_4$ ratio of 2.5 to 4.5, inclusive (2.5 ≤iso-$C_4$/n-$C_4$≤4.5) during a Constraint Index test, at 40 minutes on-stream using the process and conditions described in Example 2 herein. High iso-$C_4$/normal-$C_4$ ratios are indicative of large pore selectivity.

EXAMPLES

The following illustrative examples are intended to be non-limiting.

Example 1

Synthesis of Zeolites

Boron SSZ-57 was made as previously described in Example 2 of U.S. Pat. No. 6,544,495 to Elomari, issued Apr. 8, 2003. The material was then calcined in a thin bed under a flow nitrogen with a 2% air bleed. The ramp program was 1° C./min to 120° C. The calcination was held at that temperature for 2 hours and then ramped as before up to 540° C. and held there for 5 hours. There is no need for ion-exchange at this stage as it accomplished in the acidic aluminum treatment to follow.

Several batches of Al-SSZ-57LP were prepared by heating the calcined boron SSZ-57 at 95° C. in an aqueous aluminum nitrate solution for various lengths of time. In one instance, 1.0 grams of zeolite was subjected to 0.25 gram of aluminum nitrate nonahydrate and 10 mls of water and the heating was carried out in a closed bottle for 4 days. Running the reaction at short time periods can produce SSZ-57LP with less Al (and thus a higher SAR values) when it is desirable to create a material with only a few active acidic catalytic centers in the large pore region.

The samples are worked up by first washing 2 times with 50 ml of 0.01 N HCl to remove any aluminum nitrate which is not part of the structure. Then the samples were washed with water and dried. NMR analyses of the product showed that it is not necessary to calcine once again to ensure that the aluminum is situated in the lattice.

The Al-SSZ-57LP zeolite product was analyzed by powder XRD. The resulting XRD pattern for the one instance noted above is shown in FIG. 1. Table 3 below shows the powder XRD lines for the calcined molecular sieve product.

TABLE 3

| 2 Theta | d-spacing (Angstroms) | Intensity |
|---|---|---|
| 7.8 | 11.3252 | 1229 |
| 8.837 | 9.9983 | 978 |
| 11.708 | 7.5525 | 70 |
| 13.762 | 6.4294 | 102 |
| 14.26 | 6.2059 | 91 |
| 14.755 | 5.9991 | 278 |
| 15.212 | 5.8198 | 83 |
| 15.637 | 5.6624 | 169 |
| 17.188 | 5.1548 | 77 |
| 17.188 | 5.1548 | 76 |
| 17.683 | 5.0117 | 191 |
| 19.021 | 4.6619 | 119 |
| 19.769 | 4.4874 | 108 |
| 20.858 | 4.2555 | 289 |
| 21.812 | 4.0714 | 104 |
| 23.1 | 3.8472 | 1896 |
| 23.635 | 3.7612 | 240 |
| 24.32 | 3.6569 | 413 |
| 24.731 | 3.5971 | 133 |
| 25.08 | 3.5478 | 131 |
| 25.984 | 3.4264 | 134 |
| 26.66 | 3.341 | 919 |
| 29.005 | 3.076 | 122 |
| 30.224 | 2.9547 | 214 |
| 34.117 | 2.6259 | 72 |
| 35.806 | 2.5058 | 84 |
| 36.213 | 2.4785 | 77 |
| 36.542 | 2.457 | 91 |
| 36.978 | 2.429 | 72 |
| 37.677 | 2.3856 | 59 |
| 39.552 | 2.2767 | 72 |
| 40.267 | 2.2379 | 46 |

Al-SSZ-57 was synthesized as previously described in Example 5 of U.S. Pat. No. 6,544,495 to Elomari, issued Apr. 8, 2003. The material was calcined as described above and then converted to the H+ form using the method described in Example 9 of U.S. Pat. No. 6,544,495.

Al-ZSM-11 was made by heating a ratio of 1 $SiO_2$:0.03 $Al_2O_3$:0.20 SDA (as disclosed in O. Terasaki et al., Chemistry of Materials vol 8 (1996) pg 463-468):0.10 NaOH:30 $H_2O$, and heating at 160° C. for 6 days. The material was calcined as described above and then converted to the H+ form using the method described in Example 9 of U.S. Pat. No. 6,544,495.

Example 2

Constraint Index Determination

The H+ form of each zeolite was pelletized at 3 kpsi, crushed and granulated to 20-40 mesh. A 0.6 g sample of the granulated material was calcined in air at 540° C. for 4 hours and cooled in a desiccator to ensure dryness. Then, 0.5 g was packed into a ⅜ inch stainless steel tube with alundum on both sides of the molecular sieve bed. A Lindburg furnace was used to heat the reactor tube. Helium was introduced into the reactor tube at 10 mL/minute and at atmospheric pressure. The reactor was heated to about 316° C., and a 50/50 feed of n-hexane and 3-methylpentane was introduced into the reactor at a rate of 8 μL/min. The feed was delivered by a Brownlee pump. Direct sampling into a GC began after 10 minutes of feed introduction. The Constraint Index (CI) value was calculated from the GC data using methods known in the art.

The Constraint Index results are set forth in Table 4.

TABLE 4

| Zeolite | Time on-stream (min) | CI value |
|---|---|---|
| Al-SSZ-57LP | 10 | 0.4 |
|  | 40 | 0.4 |
|  | 70 | 0.4 |
| Al-SSZ-57 | 10 | 1.3 |
|  | 40 | 2.0 |
|  | 70 | 3.3 |
| Al-ZSM-11 | 10 | 5.2 |
|  | 40 | 5.2 |
|  | 70 | 5.2 |

The behavior of the SSZ-57 treated with an acidic aluminum nitrate solution is strictly large pore in terms of giving a low Constraint Index and a high iso/normal $C_4$ product value of 2.5-4.5. Without wishing to be bound by any theory, it is believed that the Al-SSZ-57 made by direct synthesis has aluminum distributed throughout the structure and both the 10-MR pores and 12-MR pore regions contribute to the Constraint Index which begins to look like the ZSM-11 part as the large pores foul.

Example 3

Isomerization and Disproportionation of 1,3-Diethylbenzene Over Mono-functional Acidic Zeolites The gas phase isomerization and disproportionation of 1,3-diethylbenzene (13DEB) over the H+ forms of Al-SSZ-57, Al-SSZ-57LP and B-SSZ-57 (prepared via ion exchange of calcined B-SSZ-57 with ammonium acetate using a procedure similar to that described in Example 1 above), as well as Al-ZSM-11, were conducted at atmospheric pressure in a flow type fixed bed reactor to evaluate the contributions of the active sites located in the 12-ring versus the 10-ring pores to the reaction activities and selectivities. The experimental procedure is similar to that described for the reactions of 1,3-diisopropylbenzene (see "*Characterization of large and extra-large pore zeolites via isomerization and disproportionation of 1,3-diisopropylbenzene as a catalytic test reaction*" by C. Y. Chen, S. I. Zones, A. W. Burton, S. A. Elomari and S. Svelle in Studies in Surface Science and Catalysis, 172 (2007) 329-332, Proceedings of the 5th Tokyo Conference on Advanced Catalytic Science and Technology (2006)).

The H+ forms of the zeolites tested here were prepared as outlined above in Example 1 unless described otherwise. Prior to each catalytic experiment, the catalyst (20-40 mesh) was dehydrated in-situ in a $N_2$ flow of 150 mL/min from 20° C. to 400° C. in 3 hours and then held at 400° C. for 5 hours.

Subsequently the reactor was cooled to the reaction temperature of 150° C. which was selected to provide an initial 1,3-diethylbenzene conversion of ~20% while minimizing the undesirable cracking or secondary reactions. This initial feed conversion was achieved by adjusting the catalyst amount between 0.11 to 1.75 g while keeping the feed rate at 0.2 mmol/h and carrier gas ($N_2$) rate at 150 mL/min. Therefore, the modified residence time $W_{cat}/F_{13DEB}$ varied between 460 and 7565 g·h/mol, where $W_{cat}$ represents the weight of the dehydrated catalyst in gram at 400° C. and $F_{13DEB}$ stands for the feed rate in mol/h. A high $N_2$ flow rate of 150 mL/min was necessary during the reaction to improve the mass transfer of the product from the catalyst to product stream, minimizing the undesirable cracking or secondary reactions.

Typical for acid-catalyzed reactions, the reactions of 1,3-diethylbenzene studied in this work were accompanied by some catalyst deactivation. Therefore, all the results reported here were taken at an initial reaction time of 0.5-1.3 hours of the time-on-stream depending on the $W_{cat}/F_{13DEB}$ employed to reach the targeted initial feed conversion of ~20%. The reaction products were analyzed every 35 minutes with on-line GC equipped with a 60 m long Zebron ZB-Wax capillary column.

Table 5 shows the catalytic results from the reactions of 1,3-diethylbenzene over the aforementioned four zeolites at 150° C. Their catalytic performance is summarized below:

(1) With B-SSZ-57, the conversion of 1,3-diethylbenzene was only ~0.3 mol % at 150° C. and the long modified residence time $W_{cat}/F_{13DEB}$ of 7565 g·h/mol. When the reaction temperature was increased to 200 and 250° C., respectively, the feed conversion was lifted only to 1.2 and 3.4 mol % (data for 200 and 250° C. not shown in Table 5). 1,4-Diethylbenzene (14DEB) was essentially the only product. The formation of other products such as 1,2-diethylbenzene (12DEB), triethylbenzenes (TEBs) and ethylbenzene (EB) was negligible. It appears that boron sites present in both 10- and 12-ring pores of B-SSZ-57 are not active enough to catalyze the isomerization and disproportionation of 1,3-diethylbenzene at 150° C.

(2) When Al-SSZ-57LP was tested at 150° C. and the same modified residence time $W_{cat}/F_{13DEB}$ of 7565 g·h/mol, the conversion of 1,3-diethylbenzene was 21.2 mol %. This catalytic activity is attributed to the aluminum sites selectively located in the 12-ring pores because the boron sites are only present in the 10-ring pores in this sample and are catalytically inactive for this test reaction as demonstrated by B-SSZ-57 discussed above. The products formed in this example were 1,4- and 1,2-diethylbenzene, 1,2,4- and 1,3,5-triethylbenzene as well as ethylbenzene. The relatively low ratios of 1,4- to 1,2-diethylbenzene (12.7) and of diethylbenzenes to triethylbenzenes (20.8) suggest that the 12-ring channels provides more space for the formation of the bulkier products 1,2-diethylbenzene and triethylbenzenes.

(3) For Al-SSZ-57 sample prepared via direct synthesis in Example 1, the presence of catalytically active aluminum sites in both 12- and 10-ring pores is reflected here by the initial 1,3-diethylbenzene conversion of 20.9 mol % achieved at a relatively low modified residence time $W_{cat}/F_{13DEB}$ of 970 g·h/mol. Compared to Al-SSZ-57LP, it has higher ratios of 1,4- to 1,2-diethylbenzene (20.9) and of diethylbenzenes to triethylbenzenes (107.4). The results suggest that the less spacious 10-ring channels make more contributions to the reaction selectivities in this case, promoting the formation of the less bulky products (i.e., 1,4- vs. 1,2-diethylbenzene, and diethylbenzenes vs. triethylbenzenes).

(4) Al-ZSM-11 was investigated as a reference sample. Compared to Al-SSZ-57, Al-ZSM-11 which contains only 10-ring pores predominantly favors the formation of the less bulky products. As a result, Al-ZSM-11 has the highest ratios of 1,4- to 1,2-diethylbenzene (41.2) and of diethylbenzenes to triethylbenzenes (246.1).

(5) No formation of 1,2,3-triethylbenzene was detected most likely mainly due to the unfavorable thermodynamics for its formation. No ethylene and benzene were detected in these experiments, revealing that no dealkylation of ethyl groups in 1,3-diethylbenzene and its products occurs under the conditions applied here. It also implies that no secondary disproportionation of ethylbenzene with itself or with other heavier aromatics arises. Theoretically, the molar ratio of ethylbenzene to triethylbenzenes should equal 1.0 if disproportionation takes place only between diethylbenzenes. The higher ratios of ethylbenzene to triethylbenzenes (1.9-3.2) suggest that diethylbenzenes and triethylbenzenes perhaps disproportionate with each other to form ethylbenzene and some heavier aromatics, with the latter being adsorbed in the catalyst and not detected in the product stream.

TABLE 5

| Zeolite | $W_{cat}/F_{13DEB}$ (g·h/mol) | Initial Reaction Time (h) | Initial Conversion of 13DEB, (mol %) | Selectivity (mol %) | | | | Molar Ratio | | |
|---|---|---|---|---|---|---|---|---|---|---|
| | | | | 14DEB | 12DEB | TEBs | EB | DEBs/TEBs | 14DEB/12DEB | EB/TEBs |
| B-SSZ-57 | 7565 | 1.3 | 0.6 | 100 | 0 | 0 | 0 | — | — | — |
| Al-SSZ-57LP | 7565 | 1.3 | 21.2 | 81.3 | 6.4 | 4.2 | 6.4 | 20.8 | 12.7 | 1.9 |
| Al-SSZ-57 | 970 | 0.5 | 20.9 | 93.3 | 3.2 | 0.9 | 2.7 | 107.4 | 20.9 | 3.0 |
| Al-ZSM-11 | 505 | 0.5 | 21.3 | 96.0 | 2.3 | 0.4 | 1.3 | 246.1 | 41.2 | 3.2 |

12DEB: 1,2-diethylbenzene
13DEB: 1,3-diethylbenzene
14DEB: 1,4-diethylbenzene
EB: ethylbenzene
DEBs: diethylbenzenes
TEBs: triethylbenzenes

Example 4

Hydroisomerization of n-Hexane over Bifunctional Zeolite Catalysts

The H+ forms of the zeolites prepared above were ion exchanged with aqueous $(NH_3)_4Pd(NO_3)_2$ solution at room temperature for 12 hours to load with 0.27 wt. % Pd. The resulting catalysts were subsequently calcined in air at 350° C. The Pd-containing zeolites were then pelletized, crushed and sieved. The 20-40 mesh (0.35-0.71 mm) particles were used for the catalytic experiments.

The reactions were carried out in a flow type fixed bed reactor with pure n-hexane as feed at temperatures ranging between 204 and 366° C. (400-690° F.), pressure of 1480 kPa (200 psig), LHSV (Liquid Hourly Space Velocity) of 1 $h^{-1}$ and molar $H_2$ to hydrocarbon ratio of 6:1. Prior to each catalytic test reaction, the catalyst was reduced in situ in hydrogen at 350° C. and 1480 kPa for 3 h. Then the reactor temperature was lowered to 204° C. to start the catalytic experiment. Subsequently the reaction was continuously carried out by increasing the temperature incrementally by 5.6° C. (10° F.) toward 366° C. The reaction products were analyzed with on-line GC equipped with a 60 m long HP-1 capillary column. Each GC analysis took 20 min and all the $C_1$-$C_6$ alkanes were well separated. The amounts of the cycloalkanes and benzene in the products were negligible. Other details are described in our earlier publication (see "*Characterization of shape selective properties of zeolites via hydroisomerization of n-hexane*" by C. Y. Chen, X. Ouyang, S. I. Zones, S. A. Banach, S. A. Elomari, T. M. Davis and A. F. Ojo in the journal Microporous and Mesoporous Materials, 164 (2012) 71-81).

The hydroisomerization of n-hexane was used to evaluate a series of Pd/SSZ-57 catalysts and Pd/Al-ZSM-11. The yield ratio of mono-branched isomers (2- and 3-methylpentane) to di-branched isomers (2,2- and 2,3-dimethylbutane) and the yield ratio of 2,3- to 2,2-dimethylbutane provide a tool for characterizing the shape selective properties of various channel systems of these zeolites. The conversion of n-hexane increases with the increasing reaction temperature. At low temperatures, the hydroisomerization is the only reaction. When the reaction temperature increases, the hydrocracking reaction takes off and its yield and selectivity go up. With the competing cracking reaction occurring, as the temperature increases, the yield and selectivity to hydroisomerization products increase initially, proceed to a maximum and then decrease. The hydroisomerization proceeds first from n-hexane to the mono-branched isomers (2- and 3-methylpentane). As the reaction temperature increases, 2- and 3-methylpentane are further isomerized to 2,2- and 2,3-dimethylbutane toward the thermodynamic equilibrium. Table 6 compares the distributions of the branched isomers of n-hexane at its maximum isomer yields. The catalytic results from this reaction over the catalysts tested here are summarized below:

(1) With Pd/Al-SSZ-57 which contains aluminum sites throughout the zeolite structure, at its maximum isomer yield of 76.3 mol % at 260° C. and 1.0 LHSV, the molar ratio of the mono-branched to di-branched isomer products is 13.1:86.9 while the molar ratio of 2,2- to 2,3-dimethylbutane is 3.2:9.9 (see Table 6). As will be discussed later, these selectivities can be related to the catalytic activities of aluminum sites present in both 10- and 12-ring pores.

(2) Pd/Al-SSZ-57LP gave a maximum isomer yield of 75.1 mol % at 1.0 LHSV but a much higher temperature (327° C.) versus 260° C. for Pd/Al-SSZ-57. This high temperature reflects the fact that fewer aluminum sites are present in Al-SSZ57LP than in Al-SSZ-57. When compared to Pd/Al-SSZ-57, the molar ratio of the mono-branched to di-branched isomer products increases to 17.6:82.1 for Pd/Al-SSZ-57LP while the molar ratio of 2,2- to 2,3-dimethylbutane increases to 8.0:9.6. These results can be attributed to the aluminum sites selectively located in the 12-ring pores because the boron sites are only present in the 10-ring pores in this sample and are essentially catalytically inactive for this test reaction as will be discussed below with Pd/B-SSZ-57.

(3) At 1.0 LHSV, Pd/Al-SSZ-57LP reached its maximum isomer yield at 327° C. while Pd/Al-SSZ-57 at 260° C. Two additional experiments were carried out with Pd/Al-SSZ-57LP at longer residence times of the feed (i.e., 0.5 and 0.25 LHSV, respectively) against the typical 1.0 LHSV. The same molar $H_2$ to hydrocarbon ratio of 6:1 was employed. The results are presented in Table 6. The reaction temperature for the maximum isomer yield was reduced when the LHSV of the feed decreased. The results from both 0.5 and 0.25 LHSV show product selectivities similar to those acquired from the same catalyst at 1.0 LHSV.

(4) A Pd/B-SSZ-57 was tested at 1.0 LHSV and 230-366° C. (data not shown in Table 6). It was basically inactive when compared to Pd/Al-SSZ-57LP and Pd/Al-SSZ-57. For example, n-hexane conversion at 300, 327 and 366° C. was only 0.6, 2.8 and 8.8 mol %, respectively. The corresponding isomer yield was 0, 0.3 and 1.3 mol %, where only 2- and 3-methylpentane were detected if any. These results imply that the catalytic activity and selectivity observed with Pd/Al-SSZ-57LP are related to the aluminum sites selectively located in the 12-ring pores.

(5) Since SSZ-57 and ZSM-11 are structurally related, a Pd/Al-ZSM-11 was tested at 1.0 LHSV. As a typical 10-ring zeolite, ZSM-11 has a low molar ratio of the mono-branched to di-branched isomer products of 12.7:87.4 and a low molar ratio of 2,2- to 2,3-dimethylbutane of 2.2:10.5 at 271° C. and its maximum isomer of 63.5 mol %. These results suggest that Al-SSZ-57LP provides a catalyst example which has catalytic sites specifically and selectively created in the 12-ring pores of a 12/10-ring zeolite.

TABLE 6

| Zeolite | Temperature at Maximum Isomerization Yield (° C.) | Maximum Isomerization Yield (mol %) | LHSV ($h^{-1}$) | Distribution (mol %) | | | | |
|---|---|---|---|---|---|---|---|---|
| | | | | 2,2-DMBu | 2,3-DMBu | 2-MPn | 3-MPn | Total |
| Al-SSZ-57 | 260 | 76.3 | 1.0 | 3.2 | 9.9 | 54.0 | 32.9 | 100.0 |
| Al-SSZ-57LP | 327 | 75.1 | 1.0 | 8.0 | 9.6 | 49.0 | 33.1 | 100.0 |
| Al-SSZ-57LP | 316 | 75.6 | 0.5 | 10.7 | 9.9 | 47.3 | 32.0 | 100.0 |

TABLE 6-continued

| Zeolite | Temperature at Maximum Isomerization Yield (° C.) | Maximum Isomerization Yield (mol %) | LHSV (h$^{-1}$) | Distribution (mol %) | | | | |
|---|---|---|---|---|---|---|---|---|
| | | | | 2,2-DMBu | 2,3-DMBu | 2-MPn | 3-MPn | Total |
| Al-SSZ-57LP | 299 | 75.5 | 0.25 | 6.2 | 9.0 | 50.8 | 34.0 | 100.0 |
| Al-ZSM-11 | 271 | 63.5 | 1.0 | 2.2 | 10.5 | 53.4 | 34.0 | 100.0 |

DMBu: dimethylbutane
MPn: methylpentane

As shown, the results demonstrate that the behavior of the SSZ-57 treated with an acidic aluminum nitrate solution is strictly related to the large pores in terms of giving a low Constraint Index and a high iso/normal $C_4$ product value. Without wishing to be bound by any theory, it is believed that the Al-SSZ-57 made by direct synthesis has aluminum distributed throughout the structure and both the 10-MR pores and 12-MR pore regions contribute to the Constraint Index which begins to look like the ZSM-11 part as the large pores foul

What is claimed is:

1. An alumino-borosilicate SSZ-57 zeolite having a $SiO_2/B_2O_3$ ratio of at least 150,
   wherein the zeolite is characterized as having substantially all of its aluminum atoms located within regions of the zeolite structure which form the 12 ring channels, and
   wherein the zeolite has a Constraint Index of between 0.3 and 1.0, inclusive, at 316° C. and 40 minutes on-stream when the zeolite is subject to a 50/50 feed of n-hexane and 3-methylpentane.

2. The zeolite of claim 1, wherein the zeolite produces an iso-$C_4$/n-$C_4$ ratio of 2.5 to 4.5, inclusive, during a Constraint Index test at 316° C. and 40 minutes on-stream, when the zeolite is subject to a 50/50 feed of n-hexane and 3-methylpentane.

3. The zeolite of claim 1, wherein the zeolite has a composition as described as follows:

| $SiO_2/B_2O_3$ | at least 50 |
|---|---|
| $SiO_2/Al_2O_3$ | at least 150. |

4. An alumino-borosilicate SSZ-57 zeolite having a SiO2/B2O3 ratio of at least 150, wherein the zeolite is characterized as having substantially all of its aluminum atoms located within regions of the zeolite structure which form the 12 ring channels, made by a method comprising the steps of:
   (a) preparing a reaction mixture containing: (1) at least one source of silicon oxide; (2) at least one source of boron oxide; (3) at least one source of an element selected from Groups 1 and 2 of the Periodic Table; (4) hydroxide ions; (5) a structure directing agent selected from the group consisting of an N-butyl-N-cyclohexylpyrrolidinium cation, an N-propyl-N-cycloheptylpyrrolidinium cation, an N-butyl-N-cyclooctylpyrrolidinium cation, and mixtures thereof; and (6) water;
   (b) maintaining the reaction mixture under crystallization conditions sufficient to form crystals of borosilicate SSZ-57;
   (c) subjecting the borosilicate SSZ-57 crystals to calcination conditions; and
   (d) replacing at least a portion of the boron in the 12-ring channels of framework of the calcined borosilicate SSZ-57 with aluminum to provide an alumino-borosilicate SSZ-57characterized as having substantially all of its aluminum atoms located within regions of the zeolite structure which form the 12 ring channels; and
   wherein the zeolite has a Constraint Index of between 0.3 and 1.0, inclusive, at 316° C. and 40 minutes on-stream when the zeolite is subject to a 50/50 feed of n-hexane and 3-methylpentane.

5. The zeolite of claim 4, wherein the zeolite produces an iso-$C_4$/n-$C_4$ ratio of 2.5 to 4.5, inclusive, during a Constraint Index test at 316° C. and 40 minutes on-stream, when the zeolite is subject to a 50/50 feed of n-hexane and 3-methylpentane.

6. The zeolite of claim 4, wherein the zeolite has a composition as described as follows:

| $SiO_2/B_2O_3$ | at least 50 |
|---|---|
| $SiO_2/Al_2O_3$ | at least 150. |

7. A method for making an alumino-borosilicate SSZ-57 zeolite having a SiO2/B2O3 ratio of at least 150, wherein the zeolite is characterized as having substantially all of its aluminum atoms located within regions of the zeolite structure which form the 12 ring channels, comprising the steps of:
   (a) preparing a reaction mixture containing: (1) at least one source of silicon oxide; (2) at least one source of boron oxide; (3) at least one source of an element selected from Groups 1 and 2 of the Periodic Table; (4) hydroxide ions; (5) a structure directing agent selected from the group consisting of an N-butyl-N-cyclohexylpyrrolidinium cation, an N-propyl-N-cycloheptylpyrrolidinium cation, an N-butyl-N-cyclooctylpyrrolidinium cation, and mixtures thereof; and (6) water;
   (b) maintaining the reaction mixture under crystallization conditions sufficient to form crystals of borosilicate SSZ-57;
   (c) subjecting the borosilicate SSZ-57 crystals to calcination conditions; and
   (d) replacing at least a portion of the boron in the 12-ring channels of framework of the calcined borosilicate SSZ-57 with aluminum to provide an alumino-borosilicate SSZ-57characterized as having substantially all of its aluminum atoms located within regions of the zeolite structure which form the 12 ring channels.

8. The method of claim 7, wherein the step of replacing at least a portion of the boron in the 12-ring channels of framework of the calcined borosilicate SSZ-57 with aluminum to provide an alumino-borosilicate SSZ-57 comprises subjecting the zeolite to an amount of aluminum nitrate nonahydrate for a time and at a temperature sufficient to affect a replacement of an amount of boron in the 12-ring channel framework of the calcined borosilicate SSZ-57 with an amount of aluminum sufficient to yield an aluminoborosilicate SSZ-57 having enhanced large pore selectivity.

9. The method of claim 8, wherein the zeolite has a Constraint Index of between 0.3 and 1.0, inclusive, at 316° C. and 40 minutes on-stream when the zeolite is subject to a 50/50 feed of n-hexane and 3-methylpentane.

10. The method of claim 8, wherein the zeolite produces an iso-$C_4$/n-$C_4$ ratio of 2.5 to 4.5, inclusive, during a Constraint Index test at 316° C. and 40 minutes on-stream, when the zeolite is subject to a 50/50 feed of n-hexane and 3-methylpentane.

* * * * *